D. W. WELLS.
AUTOMOBILE CURVED ROAD ILLUMINATOR.
APPLICATION FILED JAN. 2, 1908.
927,619.
Patented July 13, 1909.
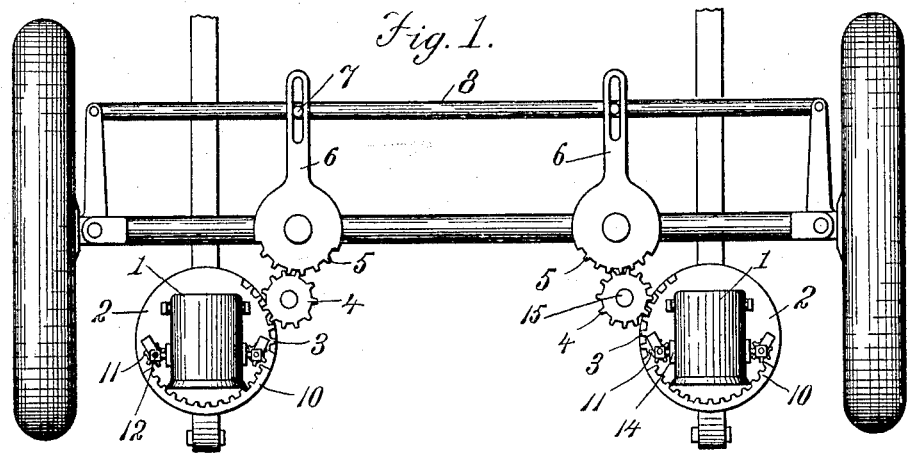
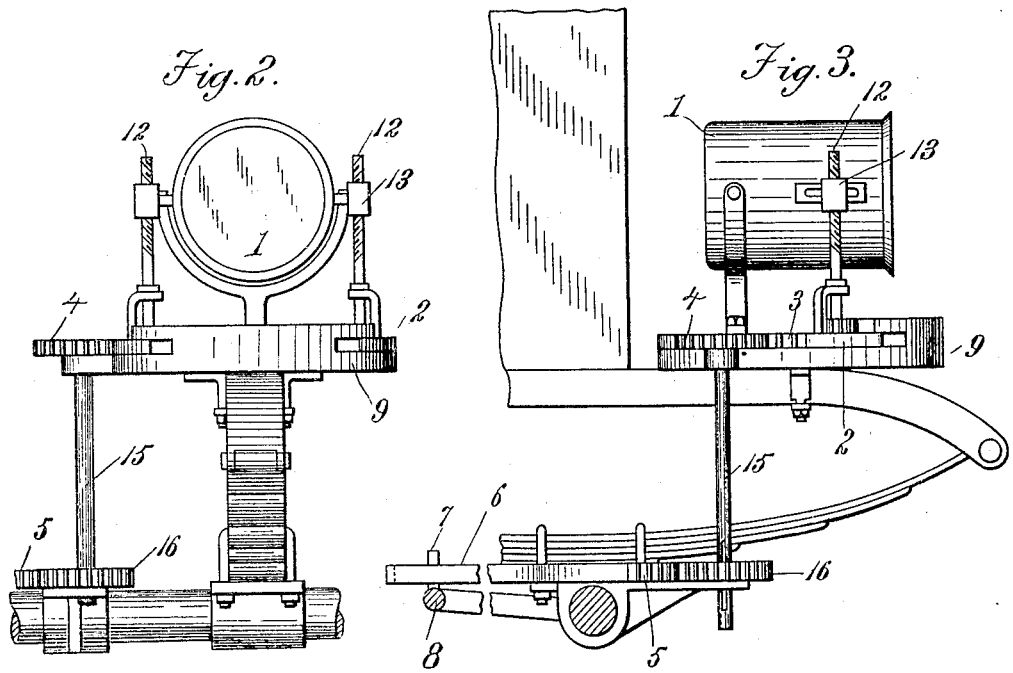
WITNESSES
INVENTOR
Darius W. Wells
BY
Medina & Griffin
ATTORNEYS ature, low-temperature, 
UNITED STATES PATENT OFFICE.

DARIUS W. WELLS, OF OAKLAND, CALIFORNIA.

AUTOMOBILE CURVED-ROAD ILLUMINATOR.

No. 927,619.  Specification of Letters Patent.  Patented July 13, 1909.

Application filed January 2, 1908. Serial No. 409,084.

*To all whom it may concern:*

Be it known that I, DARIUS W. WELLS, a citizen of the United States, residing at Oakland, in the county of Alameda and State of California, have invented a new and useful Automobile Curved-Road Illuminator, of which the following is a specification in such full and clear terms as will enable those skilled in the art to construct and use the same.

My invention relates to the art of illuminating curved roads and has for its object to provide means for causing the lamps carried by automobiles or similar vehicles to be turned at an angle corresponding to a curve in the road along which the vehicle may be traveling, and at the same time to depress the beams from said lamps so they may strike the road.

I accomplish my object by means illustrated in the accompanying drawing of which—

Figure 1 is a plan view of part of an automobile, showing my device in operative position; Fig. 2 a front view of my device; Fig. 3 a side elevation thereof.

The same numeral of reference marks the same part in all the views.

In general terms my invention consists in means for illuminating a curved road ahead of a traveling vehicle by lamps situated thereon and carried by said vehicle; and it illuminates the road by turning the lamps to conform with the curve in the road, and at the same time depressing the beams so as to cause them to strike the road instead of taking a direction tangential thereto.

Referring to the drawing, the lamps 1 are mounted on a base 2 supported in any suitable manner as shown. Said base is provided with a toothed segment 3 meshing with pinion 4. Pivoted on the axle of the vehicle is a segmental gear 5, having a slotted arm 6. A pin 7, on the steering link 8 works in said slotted arm, whereby, when said link moves to the right or left, part 5 is moved correspondingly. Movement is thereby imparted to the pinion 4 and base 3 corresponding to the degree of curvature of and in the same direction as the curve in the road. But the mere turning of the beam, as above explained would only turn the light ray at a tangent to the road, and cause it to strike a level country far away from the road itself. Wherefore I provide on surbase 9 which is stationary, a curved toothed segment 10, which engages alternately the pinions 11 on screw 12, rotating the same. Screw 12 works in block 13 loosely attached to the fore part and side of the lamp as at 14. The screws aforesaid are so directed that their turning movement draws downwardly the lamp, and causes the beam therefrom to strike downwardly toward the road. The parts are so proportioned that both the horizontal turning movement and the downward deflection are made to correspond with the degree of curvature of the road or path taken by the vehicle.

Some vehicles have their steering links placed anterior to the axle instead of behind it, as in the drawing. In such case the parts composing the gearing are reversed in a manner well known in the art.

I claim:

A rotatable base having a toothed segment, a pinion meshing with said segment, a segmental gear meshing with said pinion having a slotted arm, a pin fixed on the steering link of an automobile engaging the slot in said arm, a surbase having a curved segment, vertically disposed screws mounted on the aforesaid rotatable base and having pinions alternately meshable with said curved segment, and a lamp rotatable in a vertical plane mounted on said rotatable base having sleeves meshing with said screws.

In testimony whereof I have set my hand this 18" day of November A. D. 1907, in the presence of the two subscribed witnesses.

DARIUS W. WELLS.

Witnesses:
W. T. HESS,
FRANK P. MEDINA.